United States Patent
Stroessner

(10) Patent No.: US 11,928,227 B2
(45) Date of Patent: Mar. 12, 2024

(54) ARRANGEMENT FOR SECURING A RAIL VEHICLE AGAINST THE ACTIONS OF UNAUTHORIZED PERSONS

(71) Applicant: SIEMENS MOBILITY GMBH, Munich (DE)

(72) Inventor: Christian Stroessner, Grossenseebach (DE)

(73) Assignee: Siemens Mobility GmbH, Munich (DE)

( * ) Notice: Subject to any disclaimer, the term of this patent is extended or adjusted under 35 U.S.C. 154(b) by 615 days.

(21) Appl. No.: 17/254,974

(22) PCT Filed: Jun. 17, 2019

(86) PCT No.: PCT/EP2019/065900
§ 371 (c)(1),
(2) Date: Dec. 22, 2020

(87) PCT Pub. No.: WO2019/243264
PCT Pub. Date: Dec. 26, 2019

(65) Prior Publication Data
US 2021/0165897 A1    Jun. 3, 2021

(30) Foreign Application Priority Data
Jun. 22, 2018  (DE) .......................... 102018210242.2

(51) Int. Cl.
*G06F 21/62* (2013.01)
*B61L 25/04* (2006.01)
*B61L 27/04* (2006.01)

(52) U.S. Cl.
CPC .............. *G06F 21/62* (2013.01); *B61L 25/04* (2013.01); *B61L 27/04* (2013.01)

(58) Field of Classification Search
CPC .......... G06F 21/62; G06F 21/31; B61L 25/04; B61L 27/04; B61L 27/40; B61L 15/0072;
(Continued)

(56) References Cited

U.S. PATENT DOCUMENTS 6,181,026 B1 * 1/2001 Treharne ............... B60R 25/043
307/10.3
7,091,824 B2 * 8/2006 Matsubara .............. B60R 25/04
701/2
(Continued)

FOREIGN PATENT DOCUMENTS

| CN | 103679135 A | 3/2014 |
| CN | 103781692 A | 5/2014 |

(Continued)

*Primary Examiner* — Nam V Nguyen
(74) *Attorney, Agent, or Firm* — Laurence A. Greenberg; Werner H. Stemer; Ralph E. Locher

(57) ABSTRACT

A rail vehicle contains a vehicle control system being connected to a drive enable device which controls drive components for the operation of the vehicle. The vehicle control system is connected to a high-voltage enable device which controls high-voltage components of the rail vehicle. The rail vehicle contains a locking device containing controllable switches. A first switch is interposed between the vehicle control system and the drive enable device so that the control of the drive components can be prevented when the first switch is open and executed when the first switch is closed. A second switch is interposed between the vehicle control system and the high-voltage enable device so that the control of the high-voltage components can be prevented when the second switch is open and executed when the second switch is closed. The locking device is connected to an enable device which closes the switches after an authentication.

12 Claims, 1 Drawing Sheet

(58) Field of Classification Search
CPC ..... B60R 25/04; B60R 2325/30; Y04S 40/20; G05B 19/02
USPC ........................................................ 340/5.81
See application file for complete search history.

(56) References Cited

U.S. PATENT DOCUMENTS

| | | | |
|---|---|---|---|
| 7,114,088 B2* | 9/2006 | Horbelt | H02J 9/005 |
| | | | 713/601 |
| 8,659,387 B2* | 2/2014 | Nitta | G07C 9/00896 |
| | | | 340/5.74 |
| 9,184,792 B2* | 11/2015 | Igarashi | H01M 50/249 |
| 10,268,623 B2* | 4/2019 | Dirauf | B61L 15/0063 |
| 2005/0075764 A1 | 4/2005 | Horst et al. | |
| 2006/0033605 A1 | 2/2006 | Bridge | |
| 2008/0106390 A1 | 5/2008 | White | |
| 2009/0048725 A1 | 2/2009 | Kane et al. | |
| 2009/0128356 A1 | 5/2009 | Nitta et al. | |
| 2010/0217462 A1* | 8/2010 | Shaffer | B61L 15/0072 |
| | | | 701/19 |
| 2011/0264304 A1 | 10/2011 | Burzio | |
| 2013/0249468 A1* | 9/2013 | Bajjuri | H02J 7/342 |
| | | | 320/109 |
| 2014/0070918 A1 | 3/2014 | Han | |
| 2015/0210303 A1 | 7/2015 | Seidler et al. | |
| 2016/0244022 A1 | 8/2016 | Lippman et al. | |
| 2017/0217457 A1* | 8/2017 | Fischer | B61L 15/0036 |

FOREIGN PATENT DOCUMENTS

| | | |
|---|---|---|
| CN | 104583049 A | 4/2015 |
| CN | 105905117 A | 8/2016 |
| DE | 102006051241 A1 | 5/2008 |
| DE | 102011002713 A1 | 7/2012 |
| DE | 102011080592 A1 | 2/2013 |
| DE | 102015202831 A1 | 9/2015 |
| DE | 102014005699 A1 | 10/2015 |
| EP | 1625989 A2 | 2/2006 |
| TW | 201627898 A | 8/2016 |

* cited by examiner

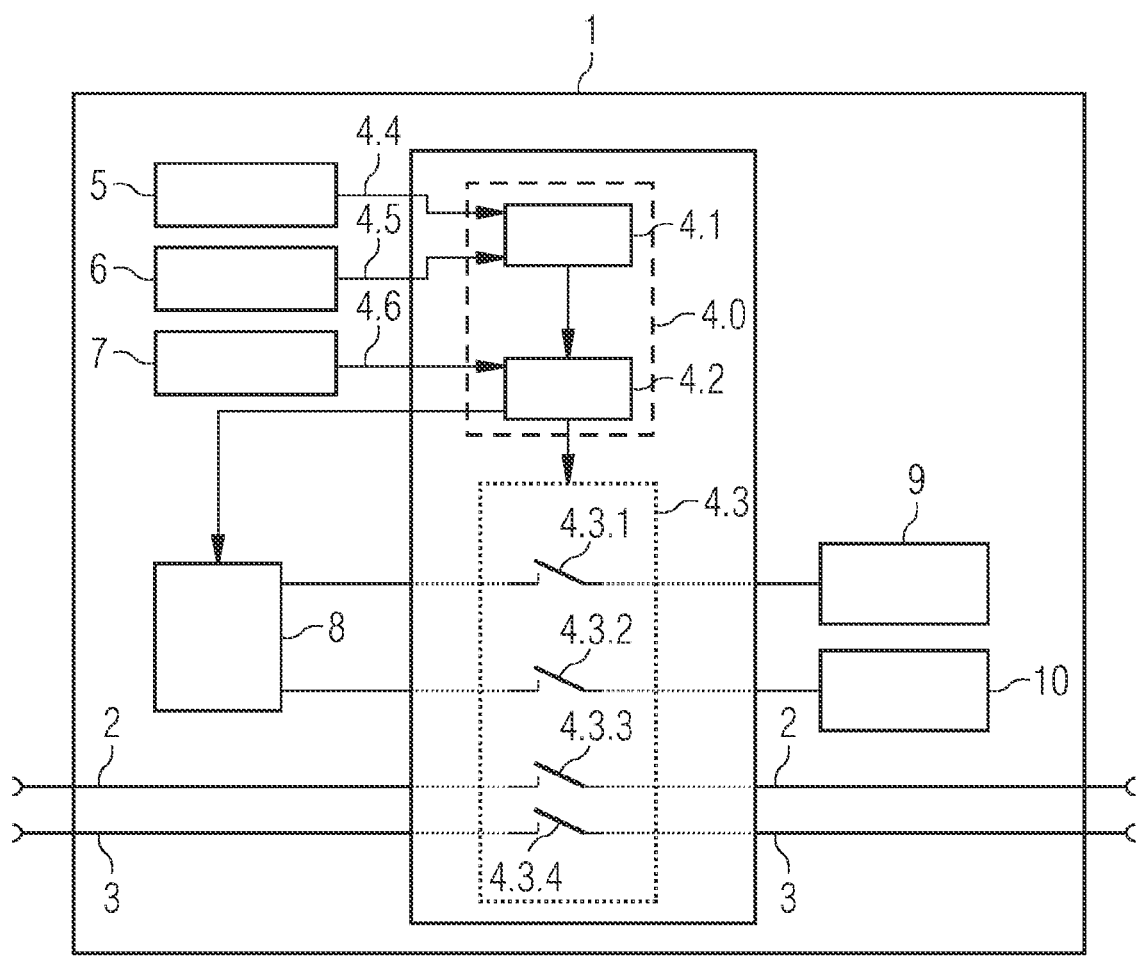

ARRANGEMENT FOR SECURING A RAIL VEHICLE AGAINST THE ACTIONS OF UNAUTHORIZED PERSONS

BACKGROUND OF THE INVENTION

Field of the Invention

The invention relates to an arrangement for securing a rail vehicle against actions (e.g. start-up, movements, etc.) executed by unauthorized persons. By way of rail vehicles, the invention particularly addresses traction vehicles, locomotives, railway vehicles, etc.

Operators of rail vehicles increasingly require that these be protected against actions on the part of unauthorized persons in an improved and adequate manner.

On the grounds of the variety of infrastructures used by rail vehicle operators, and the long service lives of rail vehicles, of up to 40 years or more, rail vehicles currently in circulation are equipped with an extremely wide variety of protective mechanisms, some of which are outdated.

For the protection of rail vehicles against actions by unauthorized persons, for example, mechanical closing systems (e.g. door locks) are employed, or vehicle-specific key-operated electronic switches are used for the protection of rail vehicles.

Some operators employ standardized remote control systems for rail vehicles (traction vehicles), which permit the remote control of the vehicle from the exterior. Thus, for example, multiple unit or driving trailer operation is achieved by means of train control buses or remote radio control systems.

Remote control systems of this type generally feature no separate protection against improper actions on a rail vehicle by an unauthorized person.

In older stock vehicles, in some cases, no protective mechanisms are provided for the adequate protection of these vehicles against actions by unauthorized persons.

In some cases, protective mechanisms employed, on the grounds of general technical progress, can be easily bypassed by unauthorized persons. Any adaptation of existing protective mechanisms, or the retrofitting of security systems in rail vehicles for the delivery of a state-of-the-art protection level, is associated with a high degree of complexity, with correspondingly high costs.

SUMMARY OF THE INVENTION

The object of the present invention is therefore the provision of an improved arrangement for the protection of a rail vehicle against actions by unauthorized persons, by means of which, in both new vehicles and stock vehicles, cost-effective and enhanced protection is ensured.

This object is fulfilled by the features of the independent claim. Advantageous further developments are disclosed in the dependent claims.

The invention relates to an arrangement for securing a rail vehicle against the actions of unauthorized persons. The rail vehicle contains an electronic vehicle control system, which is connected to a drive enabling device. The drive enabling device controls drive components for the operation of the rail vehicle. The vehicle control system is connected to a high-voltage enabling device, which controls high-voltage components for the operation of the rail vehicle.

The arrangement incorporates a locking device with controllable switches. A first switch is connected between the vehicle control system and the drive enabling device, such that the control of drive components can be suppressed when the first switch is open, and executed when the first switch is closed. A second switch is connected between the vehicle control system and the high-voltage enabling device, such that the control of high-voltage components can be suppressed when the second switch is open, and executed when the second switch is closed. For the control of the switches, the locking device is connected to an enabling device which, further to the authentication of an authorized person, closes the switches, in order to permit the respective controls, and thus the operation of the rail vehicle.

In a preferred further development, the enabling device incorporates an enabling system which, further to the authentication of an authorized person, initiates a closing of the switches.

The enabling system is preferably connected to a local enabling device, which is configured for the execution of an authentication of an authorized person.

In a preferred further development, the local enabling device is configured in the form of a key-operated switch which, further to the execution of the authentication of an authorized person, transmits a signal to the enabling system in order to initiate a closing of the switches.

In a preferred further development, the enabling system is connected to the local enabling device by means of a binary connection.

In a preferred further development, the enabling device incorporates an enabling code decoder which, further to the execution of the authentication of an authorized person, initiates a closing of the switches. The enabling code decoder is connected to a code transmission device, which is configured for the execution of an authentication of an authorized person and for the subsequent transmission of a valid authentication to the enabling code decoder.

In a preferred further development, the code transmission device is connected to the enabling code decoder by means of a bus system.

In a preferred further development, the valid authentication which is transmitted to the enabling code decoder includes data on the start time and end time of the authentication executed. The enabling code decoder will only initiate a closing of the switches if these time data fulfil predefined time values.

In a preferred further development, the enabling device incorporates an enabling code decoder which, further to the execution of an authentication of an authorized person, initiates a closing of the switches. The enabling code decoder is connected to a code input device (6), which is configured for the execution of an authentication of an authorized person, and for the subsequent transmission of a valid authentication to the enabling code decoder.

In a preferred further development, the code input device is connected to the enabling code decoder by means of a bus system.

In a preferred further development, the valid authentication which is transmitted to the enabling code decoder includes data on the train number and/or data with respect to a personal identification number of the authorized person. These data are compared with corresponding data which are saved in the rail vehicle. The enabling code decoder will only initiate a closing of the switches if the comparison indicates a matching of data.

In a preferred further development, the rail vehicle has a first train bus system, by means of which rail vehicle control signals for a multiple unit control system are transmitted. A third switch is integrated in the first train bus system, such that the transmission of control signals can be suppressed when the third switch is open, and executed when the third switch is closed.

In a preferred further development, the rail vehicle has any desired second train bus system, by means of which rail vehicle control signals for the multiple unit control system are transmitted. A fourth switch is integrated in the second train bus system, such that the transmission of control signals can be suppressed when the fourth switch is open, and executed when the fourth switch is closed.

For example, the first or second train bus system is configured in the form of a known wire train bus or "WTB", in the form of an ethernet train backbone or "ETB", in the form of a CAN powerline, etc.

The arrangement according to the invention can be retrofitted to stock vehicles with limited complexity, in a cost-effective manner.

An identically structured arrangement according to the invention can be integrated in new vehicles, with likewise limited complexity and in a cost-effective manner.

The arrangement according to the invention provides enhanced protection, in that main systems of the rail vehicle (e.g. drive components, high-voltage components, etc.) are locked.

The arrangement according to the invention supplements any security measures which are already present in the rail vehicle, with no technical interface issues.

With respect to production, the arrangement according to the invention is preferably provided in the form of completed standard components, such that the arrangement can be integrated in a variety of different types of rail vehicles (locomotives, multiple units, trams, underground trains, etc.) in the form of a unit.

The arrangement according to the invention assumes the functionality of an electronic "upgrade device and immobilizer", and is incorporated in electrical control circuits for high-voltage equipment, for the main switches, for the current collector and for a drive enabling device ("traction enabling device"). These control circuits, in the form of "enabling loops", are generally configured as series-connected arrangements of a plurality of systems, and exist on virtually all vehicles which have electronic vehicle control.

BRIEF DESCRIPTION OF THE DRAWING

For exemplary purposes, the present invention is described in greater detail hereinafter with reference to a single FIGURE showing an arrangement of a rail vehicle.

DETAILED DESCRIPTION OF THE INVENTION

The single FIGURE of the drawing shows a schematic representation of an arrangement according to the invention for securing a rail vehicle 1 against the actions of unauthorized persons.

The rail vehicle 1 contains an electronic vehicle control system 8, which is connected to a drive enabling device 9. This drive enabling device 9 controls drive components for the operation of the rail vehicle.

The vehicle control system 8 is connected to a high-voltage enabling device 10, which controls high-voltage components for the operation of the rail vehicle 1.

The rail vehicle 1 contains a locking device 4.3 with controllable switches 4.3.1 to 4.3.4.

A first switch 4.3.1 is connected between the vehicle control system 8 and the drive enabling device 9, such that the control of drive components can be suppressed when the first switch 4.3.1 is open, and executed when the first switch 4.3.1 is closed.

A second switch 4.3.2 is connected between the vehicle control system 8 and the high-voltage enabling device 10, such that the control of high-voltage components can be suppressed when the second switch 4.3.2 is open, and executed when the second switch 4.3.2 is closed.

For the control of the switches 4.3.1 to 4.3.4, the locking device 4.3 is connected to an enabling device 4.0 which, further to the authentication of an authorized person, closes the switches 4.3.1 to 4.3.4, in order to permit the respective controls, and thus the operation of the rail vehicle 1.

The enabling device 4.0 incorporates an enabling system 4.2 which, further to the authentication of an authorized person, initiates a closing of the switches 4.3.1 to 4.3.4. The enabling system 4.2 is connected to a local enabling device 7, which is configured for the execution of an authentication of an authorized person.

The local enabling device 7 is configured in the form of a key-operated switch which, further to the execution of authentication (i.e. the enabling of an authorized person), transmits a signal to the enabling system 4.2 in order to initiate a closing of the switches.

Alternatively, the local enabling device 7 can be configured in the form of an authentication system for the traction vehicle driver (e.g. in the form of a card reader).

The enabling system is connected to the local enabling device 7 by means of a binary connection 4.6.

The enabling device 4.0 incorporates an enabling code decoder 4.1 which, further to the execution of the authentication of an authorized person, initiates a closing of the switches 4.3.1 to 4.3.4.

The enabling code decoder 4.1 is connected to a code transmission device 5, which is configured for the execution of an authentication of an authorized person and for the subsequent transmission of a valid authentication to the enabling code decoder 4.1.

The code transmission device 5 is connected to the enabling code decoder 4.1 by means of a bus system 4.4.

The valid authentication which is transmitted to the enabling code decoder 4.1 includes data on the start time and end time of the authentication executed. The enabling code decoder 4.1 will only initiate a closing of the switches if these time data fulfil predefined time values.

The enabling code decoder 4.1 is connected to a code input device 6, which is configured for the execution of an authentication of an authorized person, and for the subsequent transmission of a valid authentication to the enabling code decoder 4.1.

The code input device 6 is connected to the enabling code decoder 4.1 by means of a bus system 4.5.

In a further development, the valid authentication which is transmitted to the enabling code decoder 4.1 includes data on the train number and/or data with respect to a personal identification number of the authorized person. These data are compared with corresponding data which are saved in the rail vehicle. The enabling code decoder 4.1 will only initiate a closing of the switches if the comparison indicates a matching of data.

For the enhancement of system security, the enabling system 4.2 is moreover connected to the vehicle control system 8.

The rail vehicle 1 has a first train bus system 2, by means of which rail vehicle control signals for a multiple unit control system are transmitted. A third switch 4.3.3 is integrated in the first train bus system 2, such that the transmission of control signals can be suppressed when the third switch 4.3.3 is open, and executed when the third switch 4.3.3 is closed.

The rail vehicle 1 has a second train bus system 3, by means of which rail vehicle control signals for the multiple unit control system are transmitted. A fourth switch 4.3.4 is integrated in the second train bus system 3, such that the transmission of control signals can be suppressed when the fourth switch 4.3.4 is open, and executed when the fourth switch 4.3.4 is closed.

In a preferred further development, electrical contacts are employed as switches, which are appropriate for the 24 V, 72 V and 110 V control current voltage levels which are customary for rail vehicles.

The enabling code decoder 4.1, by means of appropriate bus systems or transmission systems 4.4 and 4.5, receives enabling information and/or enabling certificates with the following preferred properties:

- data on an enabling key or an enabling certificate, for comparison with verification information which, on the system side, are saved in the rail vehicle 1,
- the complexity of the enabling key can vary, in accordance with a desired security level. In general, 256-bit keys are preferably employed,
- enabling information additionally includes data on the enabling start time and the enabling end time. The device 4.1 will only relay enabling information if the current time lies within the time interval received and, simultaneously, the enabling key received is valid. Further to the expiry of the end time, enabling is discontinued, and vehicle functions are blocked accordingly, enabling information optionally includes data on the train number and the personal ID of the traction vehicle driver, which are compared with information from the code input device 6. Operating personnel enter the train number and/or a personal ID on this input device. Only if the information input matches the transmitted codes/certificates will the decoder 4.1 relay the enabling information, by means of the enabling system,
- all conventional data transmission systems (e.g. ethernet systems) or MVB-based transmission functions can be employed by way of bus transmission systems,
- as a source for the enabling information, code input devices 6 can be employed, which are either already present in the vehicle (e.g. driver's cab displays) or are provided in the form of additionally installed input units. Alternatively, enabling information is transmitted to the system by means of code transmitters 5. To this end, remote data transmission devices employed in the vehicle, or storage systems with an interface (e.g. a NAS system with a USB interface) can be used.

The above-mentioned elements: "enabling device 4.0" and "locking device 4.3", in combination, embody the core functionality of an "upgrade device" or "immobilizer".

The invention claimed is:

1. A configuration for securing a rail vehicle against actions of unauthorized persons, the configuration comprising:
    an electronic vehicle control system;
    a drive enabling device controlling drive components for an operation of the rail vehicle and connected to said electronic vehicle control system;
    a high-voltage enabling device connected to said electronic vehicle control system, said high-voltage enabling device controlling high-voltage components for the operation of the rail vehicle;
    a locking device with controllable switches including a first switch connected between said electronic vehicle control system and said drive enabling device, such that a control of the drive components can be suppressed when said first switch is open, and executed when said first switch is closed, said controllable switches further including a second switch connected between said electronic vehicle control system and said high-voltage enabling device, such that a control of the high-voltage components can be suppressed when said second switch is open, and executed when said second switch is closed; and
    an enabling device, wherein for control of said controllable switches, said locking device is connected to said enabling device which, further to an authentication of an authorized person, closes said controllable switches, in order to permit respective controls, and thus the operation of the rail vehicle.

2. The configuration according to claim 1,
    wherein said enabling device has an enabling system which, further to the authentication of the authorized person, initiates a closing of said controllable switches;
    further comprising a local enabling device; and
    wherein said enabling system is connected to said local enabling device, which is configured for an execution of the authentication of the authorized person.

3. The configuration as claimed in claim 2, wherein said local enabling device is configured in a form of a key-operated switch which, further to the execution of the authentication of the authorized person, transmits a signal to said enabling system to initiate the closing of said controllable switches.

4. The configuration according to claim 3, further comprising a binary connection, said enabling system is connected to said local enabling device by means of said binary connection.

5. The configuration according to claim 1,
    wherein said enabling device has an enabling code decoder which, further to an execution of the authentication of the authorized person, initiates the closing of said controllable switches; and
    further comprising a code transmission device connected to said enabling code decoder, said code transmission device is configured for the execution of the authentication of the authorized person and for a subsequent transmission of a valid authentication to said enabling code decoder.

6. The configuration according to claim 5, further comprising a bus system, said code transmission device is connected to said enabling code decoder by means of said bus system.

7. The configuration according to claim 5, wherein:
    the valid authentication which is transmitted to said enabling code decoder includes data on a start time and an end time of an authentication executed; and
    said enabling code decoder will only initiate the closing of said controllable switches if the start time and the end time fulfill predefined time values.

8. The configuration according to claim 1,
    wherein said enabling device has an enabling code decoder which, further to an execution of the authentication of the authorized person, initiates the closing of said controllable switches;
    further comprising a code input device; and
    wherein said enabling code decoder is connected to said code input device, which is configured for an execution of the authentication of the authorized person, and for a subsequent transmission of a valid authentication to said enabling code decoder.

9. The configuration according to claim 8, further comprising a bus system, said code input device is connected to said enabling code decoder by means of said bus system.

10. The configuration according to claim 8, wherein:
the valid authentication which is transmitted to said enabling code decoder includes data on a train number and/or data with respect to a personal identification number of the authorized person;
the data on the train number and the data with respect to the personal identification number are compared with saved data corresponding to the train number and to the personal identification number which are saved in the rail vehicle; and
said enabling code decoder will only initiate the closing of said controllable switches if a comparison indicates a matching of the data and the saved data.

11. The configuration according to claim 1, further comprising:
a first train bus system, by means of which rail vehicle control signals for a multiple unit control system are transmitted; and
a third switch integrated in said first train bus system, such that a transmission of the rail vehicle control signals can be suppressed when said third switch is open, and executed when said third switch is closed.

12. The configuration according to claim 1, further comprising:
a second train bus system, by means of which rail vehicle control signals for a multiple unit control system are transmitted; and
a fourth switch is integrated in said second train bus system, such that a transmission of the rail vehicle control signals can be suppressed when said fourth switch is open, and executed when said fourth switch is closed.

* * * * *